Patented Jan. 7, 1941

2,227,997

UNITED STATES PATENT OFFICE 2,227,997

PREPARATION OF POLYMERIZED VINYL ALCOHOL

Herbert Berg, Burghausen, Upper Bavaria, Germany, assignor to Chemische Forschungsgesellschaft m. b. H., Munich, Germany, a corporation of Germany No Drawing. Application May 5, 1938, Serial No. 206,272. In Germany May 10, 1937

20 Claims. (Cl. 260—90)

This invention relates to a process for the production of polyvinyl alcohol and partial derivatives thereof.

The conventional method of preparing polymerized vinyl alcohol is by the saponification of polymerized vinyl esters or of other saponifiable polymerized vinyl compounds such as polyvinyl ethers or acetals. Thus, as described in Herrmann and Haehnel United States Patent 1,672,156, a polymerized vinyl ester, such as polyvinyl acetate, is reacted in alcoholic solution with an alkali, such as potassium hydroxide. The products of the reaction are polyvinyl alcohol and an alkaline salt of the acid corresponding to the polyvinyl ester used, i. e. when the initial reactants are polyvinyl acetate and potassium hydroxide, polyvinyl alcohol and potassium acetate are formed. The principal disadvantage of this process lies in the fact that the polyvinyl alcohol is contaminated to a considerable extent with alkaline salts which, as a general rule, cannot be removed by ordinary washing methods. Accordingly, in order to obtain a pure product, it is necessary to resort to rather cumbersome purification methods, such as dissolving and reprecipitating the polyvinyl alcohol or subjecting it to dialysis. The use of such purification methods, of course, adds considerably to the cost of producing the product.

More recently Herrmann, Haehnel and Berg (U. S. P. 2,109,883) have found that polyvinyl alcohol could be obtained by the catalytic hydrolysis of polymerized vinyl esters or other hydrolyzable polymerized vinyl compounds. According to this method, a solution of a polymerized vinyl compound is reacted with an alcohol in the presence of a small amount of an alkali or an acid as a hydrolysis catalyst. Starting, for example, with polymerized vinyl acetate and methanol, the products of the reaction are polyvinyl alcohol and methyl acetate. The amount of catalyst employed is so small that no significant contamination of the product occurs, and it is thus possible to obtain directly polyvinyl alcohol of a high degree of purity without further purification.

The foregoing method is, in most respects, very satisfactory and has been extensively employed in the manufacture of polyvinyl alcohol. However, in carrying out this process on a commercial scale, the economic recovery of the excess alcohol and the other solvents used in, or produced by, the reaction has proven troublesome. It has been considered necessary to use a considerable excess of alcohol in the reaction in order to dissolve the polymerized vinyl ester, and it is usually difficult to separate such excess alcohol from the ester formed in the reaction. Thus, when polyvinyl acetate is hydrolyzed in methanol solution, a mixture of methanol and methyl acetate is obtained. Since these two compounds form a low-boiling binary mixture, the constituents cannot be separated by ordinary distillation methods.

The present invention constitutes an improvement over the process of U. S. P. 2,109,883. An object of the invention is to provide an improved method for partially or completely hydrolyzing derivatives of polyvinyl alcohol. A further object is to provide a method of preparing hydrolysis products of polyvinyl alcohol derivatives wherein the degree of hydrolysis of the product can be readily and precisely controlled. A further object is to provide a method of hydrolyzing polyvinyl alcohol derivatives wherein the utilization of alcohols and other solvents is more economical than in prior methods. Other objects and advantages of the invention will be apparent from the ensuing description thereof.

In the method of the invention a polyvinyl alcohol derivative, such as an ester, ether, acetal or ester-acetal of polyvinyl alcohol, is reacted with an alcohol (with or without an inert diluent) in the presence of a hydrolysis catalyst, the proportion of alcohol (plus inert diluent, if any) being such that the polyvinyl derivative is not completely dissolved, but a plastic or doughy mass is formed. I have found, very surprisingly, that by mechanically working the apparently unmanageable mass thus formed, the hydrolysis reaction proceeds readily and finally the mass is converted to a slurry of the hydrolysis product, from which the pure product may be easily separated.

The reaction may be carried out in any of the conventional mixing or kneading machines such as are commonly used in the plastic arts. They may be in the form of blade mixers, worm mixers which involve extruding the material through orifices, roller mills and the like. Machines of these types are widely used in the manufacture of rubber and plastics, in the kneading of bread dough, etc., and therefore need not be further described for the purposes of the present invention. Preferably, the mixing machine should be provided with cooling means, such as water coils, in order to remove the heat generated by the hydrolysis reaction.

As an inert solvent or diluent it is generally preferred to utilize the same ester as is formed by the reaction of the alcohol with the polyvinyl ester, so that the final mother liquor contains substantially only the ester or mixtures thereof with the excess alcohol used. The invention, however, is not limited to the use of such esters as solvents, as other inert solvents can be used, especially those which can be easily distilled from the reaction product, such as acetone, benzol and the like.

In the process of the invention satisfactory conversion takes place readily at relatively low temperatures. It is, in fact, preferable to maintain a low temperature during the reaction period by cooling the reaction mixture. It has been found that room temperatures are especially suitable for carrying out the conversion, more particularly temperatures of about 15 to 30° C. The invention, however, is not limited to this particular temperature range since the reactions can be carried out satisfactorily at higher or lower temperatures.

The hydrolysis reaction is promoted by the action of alkaline catalysts, such as sodium or potassium hydroxides, or acid catalysts, such as dilute sulfuric or hydrochloric acids. In general, alkalies are to be preferred over acids. Although these catalysts enable the conversion to be completed in the same or even less time than is required in the saponification process (in which relatively large amounts of alkalies are used), the amounts necessary are so small that they do not appreciably contaminate the reaction product. The amount of catalyst used should be substantially less than the stoichiometric equivalent of the vinyl compound. I generally prefer to utilize as a catalyst an alkali metal alcoholate of the same alcohol as is used for the hydrolysis reaction.

As the hydrolyzing agent, any alcohol which is liquid under the conditions of the reaction may be used, but it has been found that methanol offers particular advantages because of the readiness with which it forms esters and because of the low boiling point of the methyl esters. However, depending upon special conditions or upon the commercial demand for the various esters formed, it may be advantageous to use other alcohols, such as ethyl alcohol, propyl alcohol, butyl alcohol, glycols, etc.

Water exerts an inhibiting effect upon the hydrolysis reaction; hence, although relatively small amounts of water may be tolerated, it is preferred that the hydrolytic alcohols, as well as the other reactants, be as nearly anhydrous as is feasible. The amount of hydrolytic alcohol used need not substantially exceed the stoichiometric equivalent of the polyvinyl derivative being hydrolyzed in order to produce a completely hydrolyzed product. Where an only partially hydrolyzed product is desired, even less than the stoichiometric equivalent may be used.

In the production of partially hydrolyzed products, the reaction may be interrupted at the desired stage of conversion by neutralizing the catalyst or by the addition of water to the reaction mixture.

The following examples are given as illustrative of the invention:

Example I 2100 grams of dry polyvinyl acetate (a low polymer having a viscosity of 17 in a 50% solution at 20° C. as determined by the Hercules powder falling ball method) are intimately kneaded with a mixture of 780 grams of anhydrous methanol and 120 grams of anhydrous methyl acetate, containing 6.3 grams of sodium as sodium methylate. The temperature is maintained at 20° C. by water cooling. After about 20 minutes, a dough-like mass is obtained which thereafter is slowly converted into a voluminous powder. The kneading is continued for about two hours to complete alcoholysis, whereafter the formed methyl acetate is distilled off. The resultant polyvinyl alcohol is a white powder, which can be utilized for all purposes without any further treatment. The methyl acetate formed is practically pure and can be used directly for solvent purposes without further purification.

Example II

In a somewhat larger kneading machine than that used in Example I, 260 kg. of dry polyvinyl acetate (a high polymer having a viscosity of 40 measured as described in Example I at 20° C. but in a 20% solution) is mixed with 140 kg. of anhydrous methanol to form a homogenous mass. While maintaining the mixture at a temperature of 20 to 25° C., 250 grams of sodium, as a 1% solution of sodium methylate in methyl alcohol, are added. After 20 minutes the viscosity of the mixture increases, and the mixture then becomes voluminous and dough-like in appearance. After further kneading for 40 minutes, another 100 grams of sodium, as a 1% solution of sodium methylate in methyl alcohol, is added. The product is slowly transformed to a thick paste or slurry of polyvinyl alcohol in the mother liquor. To complete the reaction, a further amount of 150 grams of sodium in the form of a more concentrated solution of the methylate is added to the mixture. The polyvinyl alcohol is separated from this mixture as described in Example I. The resultant polyvinyl alcohol is about 99% hydrolyzed. The mixture of methyl acetate and methanol distilled off contains about 75% methyl acetate.

Example III

Proceeding in the same manner as described in Example II, but neutralizing the catalyst with acetic acid half an hour after the first addition of sodium methylate (i. e. when 250 grams of sodium as a 1% sodium methylate solution for 260 kg. polyvinyl acetate have been added) the resultant product is a partially substituted polyvinyl alcohol having a saponification number of about 230. It is only partially soluble in methanol and ethanol and is insoluble in water. The same result can be obtained by diluting the reaction mixture with water instead of neutralizing the catalyst with acid.

Example IV

Proceeding in the same way as in Example II, but neutralizing the catalyst half an hour after the second addition of sodium methylate (i. e., when the mixture contains 350 grams of sodium as sodium methylate for 260 kg. polyvinyl acetate), a product with a saponification number of about 130 to 140 is obtained. This product is insoluble in methanol and ethanol, but soluble in water. It is an excellent emulsifying agent.

The foregoing examples describe the treatment of polyvinyl acetate; however, other polyvinyl derivatives can be similarly hydrolyzed according to the invention, as for example other esters of polyvinyl alcohol such as polyvinyl formate, propionate, and butyrate; also polyvinyl ethers, acetals and ester-acetals and interpolymers and mixed polymers of polyvinyl esters with each other or with other polymerizable compounds, such as the interpolymers of vinyl esters and fatty oils disclosed in U. S. Patent 1,934,297 to Eibner et al., are suitable.

The present invention affords a means of obtaining in a simple and efficacious manner, partially substituted polyvinyl alcohols of any desired degree of hydrolysis. Since the properties of these products vary considerably in accordance with the proportion of hydroxyl groups that remain substituted, it is important to be able to control precisely and reproducibly the extent of hydrolysis. It is possible to do so more effectively in the present process than in the methods that have been practiced heretofore.

The present invention also provides a number of technical advantages which are of importance in the manufacture of polyvinyl alcohol. Thus, the conversion of the raw materials into the final product may be carried out in one working step and in one apparatus. The product can be dried in the reaction vessel and no filtration, extraction or other purification thereof is required.

The fact that the total amount of solvent used in the reaction is substantially less than in prior processes naturally results in lower solvent losses and in important economies in the heat required for the distillation thereof. Moreover, since the process of the invention can be operated with substantially stoichiometric amounts of the hydrolytic alcohol, the by-product ester may be obtained in substantially pure form, thus obviating the necessity of subjecting it to further distillation or other purification.

It is to be understood that the invention is not restricted to the specific embodiments thereof described hereinabove, but embraces all such variations, modifications and equivalents as fall within the scope of the appended claims.

I claim:

1. The method of hydrolyzing a derivative of polyvinyl alcohol which comprises reacting the same with an alcohol which is liquid under the conditions of reaction in the presence of a hydrolysis catalyst, the relative proportions of liquid and solid constituents in the reaction mixture being such as to form a kneadable plastic mass, and kneading said plastic mass.

2. The method of hydrolyzing a polymerized vinyl ester which comprises reacting the same with an alcohol which is liquid under the conditions of reaction in the presence of a hydrolysis catalyst, the relative proportions of liquid and solid constituents in the reaction mixture being such as to form a kneadable plastic mass, and kneading said plastic mass.

3. The method of hydrolyzing polymerized vinyl acetate which comprises reacting the same with an alcohol which is liquid under the conditions of reaction in the presence of a hydrolysis catalyst, the relative proportions of liquid and solid constituents in the reaction mixture being such as to form a kneadable plastic mass, and kneading said plastic mass.

4. The method of hydrolyzing a derivative of polyvinyl alcohol which comprises reacting the same with methanol in the presence of a hydrolysis catalyst, the relative proportions of liquid and solid constitutents in the reaction mixture being such as to form a kneadable plastic mass, and kneading said plastic mass.

5. The method of hydrolyzing poylmerized vinyl acetate which comprises reacting the same with methanol in the presence of a hydrolysis catalyst, the relative proportions of liquid and solid constitutents in the reaction mixture being such as to form a kneadable plastic mass, and kneading said plastic mass.

6. The method of hydrolyzing a derivative of polyvinyl alcohol which comprises reacting the same with an alcohol which is liquid under the conditions of reaction in the presence of an alkali metal alcoholate as a hydrolysis catalyst, the relative proportions of liquid and solid constituents in the reaction mixture being such as to form a kneadable plastic mass, and kneading said plastic mass.

7. The method of hydrolyzing polymerized vinyl acetate which comprises reacting the same with methanol in the presence of an alkali metal methylate as a hydrolysis catalyst, the relative proportions of liquid and solid constituents in the reaction mixture being such as to form a kneadable plastic mass, and kneading said plastic mass.

8. The method of hydrolyzing a derivative of polyvinyl alcohol which comprises reacting the same with an alcohol which is liquid under the conditions of reaction in the presence of a hydrolysis catalyst and of an inert diluent, the relative proportions of liquid and solid constituents in the reaction mixture being such as to form a kneadable plastic mass, and kneading said plastic mass.

9. The method of hydrolyzing a polymerized vinyl ester which comprises reacting the same with an alcohol which is liquid under the conditions of reaction in the presence of a hydrolysis catalyst and of an inert diluent comprising an ester corresponding to the said alcohol and the acid residue of the said polyvinyl ester, the relative proportions of liquid and solid constituents in the reaction mixture being such as to form a kneadable plastic mass, and kneading said plastic mass.

10. The method of hydrolyzing polymerized vinyl acetate which comprises reacting the same with methanol in the presence of a hydrolysis catalyst and of methyl acetate, the relative proportions of liquid and solid constituents in the reaction mixture being such as to form a kneadable plastic mass, and kneading said plastic mass.

11. The method of hydrolyzing a polymerized vinyl ester which comprises reacting the same with an alcohol which is liquid under the conditions of reaction in the presence of a hydrolysis catalyst, the relative proportions of liquid and solid constituents in the reaction mixture being such as to form a kneadable plastic mass, and kneading said plastic mass while maintaining the same at a temperature of 15–30° C.

12. The method of hydrolyzing a polymerized vinyl ester which comprises reacting the same with an alcohol which is liquid under the conditions of reaction in the presence of a hydrolysis catalyst and of an inert diluent comprising an ester corresponding to the said alcohol and the acid residue of the said polyvinyl ester, the relative proportions of liquid and solid constituents in the reaction mixture being such as to form a kneadable plastic mass, and kneading said plastic mass while maintaining the same at a temperature of 15–30° C.

13. The method of hydrolyzing polymerized vinyl acetate which comprises reacting the same with an alcohol which is liquid under the conditions of reaction in the presence of a hydrolysis catalyst and of an inert diluent comprising an ester corresponding to the said alcohol and the acid residue of the said polyvinyl ester, the relative proportions of liquid and solid constituents in the reaction mixture being such as to form a kneadable plastic mass, and kneading said plastic mass while maintaining the same at a temperature of 15–30° C.

14. The method of hydrolyzing polymerized vinyl acetate which comprises reacting the same with methanol in the presence of an alkali metal methylate as a hydrolysis catalyst and of methyl acetate, the relative proportions of liquid and solid constituents in the reaction mixture being such as to form a kneadable plastic mass, and kneading said plastic mass while maintaining the same at a temperature of 15–30° C.

15. The method of hydrolyzing a derivative of polyvinyl alcohol which comprises reacting the same with an alcohol in the presence of a hydrolysis catalyst, the relative proportions of liquid and solid constituents in the reaction mixture being such as to form a kneadable plastic mass, kneading said plastic mass and interrupting the reaction by neutralizing the said catalyst when the desired degree of hydrolysis has been attained.

16. The method of hydrolyzing a derivative of polyvinyl alcohol which comprises reacting the same with an alcohol in the presence of a hydrolysis catalyst, the relative proportions of liquid and solid constituents in the reaction mixture being such as to form a kneadable plastic mass, kneading said plastic mass and interrupting the reaction by the addition of water when the desired degree of hydrolysis has been attained.

17. The method of hydrolyzing a polymerized vinyl ester which comprises reacting the same with an alcohol in the presence of a hydrolysis catalyst and of an inert diluent, the relative proportions of liquid and solid constituents in the reaction mixture being such as to form a kneadable plastic mass, kneading said plastic mass and interrupting the reaction by neutralizing the said catalyst when the desired degree of hydrolysis has been attained.

18. The method of hydrolyzing a polymerized vinyl ester which comprises reacting the same with an alcohol in the presence of a hydrolysis catalyst and of an inert diluent, the relative proportions of liquid and solid constituents in the reaction mixture being such as to form a kneadable plastic mass, kneading said plastic mass and interrupting the reaction by the addition of water when the desired degree of hydrolysis has been attained.

19. The method of hydrolyzing polymerized vinyl acetate which comprises reacting the same with methanol in the presence of an alkali metal methylate as a hydrolysis catalyst and of methyl acetate, the relative proportions of liquid and solid constituents in the reaction mixture being such as to form a kneadable plastic mass, kneading said plastic mass while maintaining the same at a temperature of 15–30° C. and interrupting the reaction by neutralizing the alkali metal methylate when the desired degree of hydrolysis has been attained.

20. The method of hydrolyzing polymerized vinyl acetate which comprises reacting the same with methanol in the presence of an alkali metal methylate as a hydrolysis catalyst and of methyl acetate, the relative proportions of liquid and solid constituents in the reaction mixture being such as to form a kneadable plastic mass, kneading said plastic mass while maintaining the same at a temperature of 15–30° C., and interrupting the reaction by the addition of water when the desired degree of hydrolysis has been attained.

HERBERT BERG.